United States Patent
Aoki et al.

(10) Patent No.: US 11,143,755 B2
(45) Date of Patent: Oct. 12, 2021

(54) RADAR APPARATUS

(71) Applicant: DENSO TEN Limited, Kobe (JP)

(72) Inventors: Shinya Aoki, Kobe (JP); Seiya Fujitsu, Kobe (JP)

(73) Assignee: DENSO TEN Limited, Kobe (JP)

( * ) Notice: Subject to any disclaimer, the term of this patent is extended or adjusted under 35 U.S.C. 154(b) by 372 days.

(21) Appl. No.: 16/285,629

(22) Filed: Feb. 26, 2019

(65) Prior Publication Data
US 2020/0025908 A1    Jan. 23, 2020

(30) Foreign Application Priority Data
Mar. 16, 2018 (JP) .............................. JP2018-048877

(51) Int. Cl.
*G01S 13/72* (2006.01)
*G01S 13/931* (2020.01)

(52) U.S. Cl.
CPC .......... *G01S 13/723* (2013.01); *G01S 13/931* (2013.01); *G01S 2013/932* (2020.01)

(58) Field of Classification Search
CPC ........ G01S 13/66; G01S 13/72; G01S 13/723; G01S 13/726; G01S 13/931; G01S 2013/932
See application file for complete search history.

(56) References Cited

U.S. PATENT DOCUMENTS

| 9,874,634 B1* | 1/2018 | Moriuchi ................ G01S 13/42 |
| 2012/0056773 A1* | 3/2012 | Sato ...................... G01S 13/584 |
| | | 342/109 |
| 2013/0207832 A1* | 8/2013 | Mizutani ............... G01S 7/4026 |
| | | 342/70 |
| 2013/0207833 A1* | 8/2013 | Mizutani ............... B60W 30/14 |
| | | 342/70 |
| 2013/0207834 A1* | 8/2013 | Mizutani ................ G01S 7/411 |
| | | 342/70 |
| 2013/0222176 A1* | 8/2013 | Ishimori ............... G01S 13/584 |
| | | 342/70 |
| 2013/0321195 A1* | 12/2013 | Moriuchi .............. G01S 13/931 |
| | | 342/70 |
| 2014/0022110 A1* | 1/2014 | Itohara .................... G01S 13/72 |
| | | 342/107 |
| 2015/0346324 A1* | 12/2015 | Takasago ............... G01S 7/352 |
| | | 342/70 |

(Continued)

FOREIGN PATENT DOCUMENTS

| JP | 2009-063440 A | 3/2009 |
| JP | 2009-264841 A | 11/2009 |
| JP | 2015-081886 A | 4/2015 |

*Primary Examiner* — Peter M Bythrow
(74) *Attorney, Agent, or Firm* — Oliff PLC

(57) ABSTRACT

A radar apparatus detects objects in a vicinity of a host vehicle on which the radar apparatus is mounted. The radar apparatus includes a microcomputer configured to operate as a prediction processor that calculates a prediction position of a previously detected target in a current detection cycle and an extrapolation processor that executes an extrapolation to determine that a same target as the previously detected target exists in the prediction position for the current detection cycle. The extrapolation processor executes the extrapolation when the prediction position is outside a detection range of the radar apparatus and a speed of the host vehicle is lower than a predetermined value.

10 Claims, 14 Drawing Sheets

(56) References Cited

U.S. PATENT DOCUMENTS

| | | | |
|---|---|---|---|
| 2015/0355315 A1* | 12/2015 | Shimizu | G01S 13/931 342/107 |
| 2015/0362592 A1* | 12/2015 | Mizutani | G01S 13/04 342/118 |
| 2016/0084942 A1* | 3/2016 | Mizutani | G01S 7/41 701/96 |
| 2016/0375903 A1* | 12/2016 | Minemura | B60Q 9/008 701/70 |
| 2017/0227632 A1* | 8/2017 | Takayama | G01S 13/95 |
| 2017/0315224 A1* | 11/2017 | Mizutani | G01S 7/352 |
| 2017/0363736 A1* | 12/2017 | Kaino | G01S 7/411 |
| 2017/0363737 A1* | 12/2017 | Kaino | G01S 13/345 |
| 2017/0371033 A1* | 12/2017 | Hamada | G01S 13/52 |
| 2018/0095103 A1* | 4/2018 | Hirai | G01P 3/64 |
| 2018/0211536 A1* | 7/2018 | Akamine | G01S 13/723 |
| 2018/0217232 A1* | 8/2018 | Miyazaki | G01S 13/931 |
| 2018/0239015 A1* | 8/2018 | Nishida | B62D 15/025 |
| 2018/0259329 A1* | 9/2018 | Yokoi | G08G 1/166 |
| 2018/0259634 A1* | 9/2018 | Okamoto | G01S 7/414 |
| 2018/0354506 A1* | 12/2018 | Minemura | B60R 21/00 |
| 2019/0011548 A1* | 1/2019 | Han | G01S 13/64 |
| 2019/0232956 A1* | 8/2019 | Takaki | B60W 30/0956 |
| 2019/0265347 A1* | 8/2019 | Wintermantel | G01S 7/354 |

\* cited by examiner

PATTERN A

PATTERN B

PATTERN C

PATTERN D

PATTERN E

PATTERN F

RADAR APPARATUS

BACKGROUND OF THE INVENTION

Field of the Invention

The invention relates to a technology for tracking a target that is detected by a radar apparatus.

Description of the Background Art

In a front-side radar apparatus, there are many situations in which an object crosses a detection range (FOV: field of view) of the radar apparatus. This is because a direction of the radar apparatus is different from a moving direction of a host vehicle, and there is a situation in which the host vehicle bumps into another vehicle as a situation to be detected, and the like. Such an object moves out of the FOV of the radar apparatus from within the FOV of the radar apparatus.

For example, when the front-side radar apparatus detects a guardrail pole, regularly aligned diamond-shaped targets shown in FIG. 14 are detected. In FIG. 14, a range of angle θ is within the FOV. Here, an attention target is shown by a black diamond shape. In situations shown in PATTERN A, PATTERN B and PATTERN C in FIG. 14, the attention target moves backward relative to the host vehicle as the host vehicle moves forward. The radar apparatus correctly tracks the attention target.

Situations shown in PATTERN D, PATTERN E, and PATTERN F in FIG. 14 are the same as the situations shown in PATTERN A, PATTERN B and PATTERN C in FIG. 14, and the attention target moves backward relative to the host vehicle as the host vehicle moves forward. As a result, the attention target moves out of the FOV. However, the radar apparatus performs a wrong tracking such that the attention target that has actually moved out of the FOV remains within the FOV.

In frequency modulation, a radar apparatus that prevents an error in pairing for combining peak frequencies in an up period and a down period has been conventionally known. However, such a radar apparatus has not prevented the wrong tracking shown in FIG. 14.

SUMMARY OF THE INVENTION

According to one aspect of the invention, a radar apparatus detects objects in a vicinity of a host vehicle on which the radar apparatus is mounted. The radar apparatus includes a microcomputer configured to operate as a prediction processor that calculates a prediction position of a previously detected target in a current detection cycle and an extrapolation processor that executes an extrapolation to determine that a same target as the previously detected target exists in the prediction position for the current detection cycle. The extrapolation processor executes the extrapolation when the prediction position is outside a detection range of the radar apparatus and a speed of the host vehicle is lower than a predetermined value.

According to another aspect of the invention, even when the prediction position is within the detection range of the radar apparatus, when the prediction position is within a predetermined range near a border between an inside of the detection range of the radar apparatus and an outside of the detection range of the radar apparatus, the prediction position is deemed to be outside the detection range of the radar apparatus.

Thus, the radar apparatus can prevent a wrong tracking shown in FIG. 14 for a target near the border between the inside of the detection range and the outside of the detection range, in which the target is difficult to be detected.

Therefore, an object of the invention is to provide a technology that can prevent a wrong tracking of a target that is detected by a radar apparatus.

These and other objects, features, aspects and advantages of the invention will become more apparent from the following detailed description of the invention when taken in conjunction with the accompanying drawings.

DESCRIPTION OF THE EMBODIMENTS

Exemplified embodiments of the invention will be hereinafter described in detail with reference to the drawings.

1. Configuration of Radar Apparatus

Figure 1:
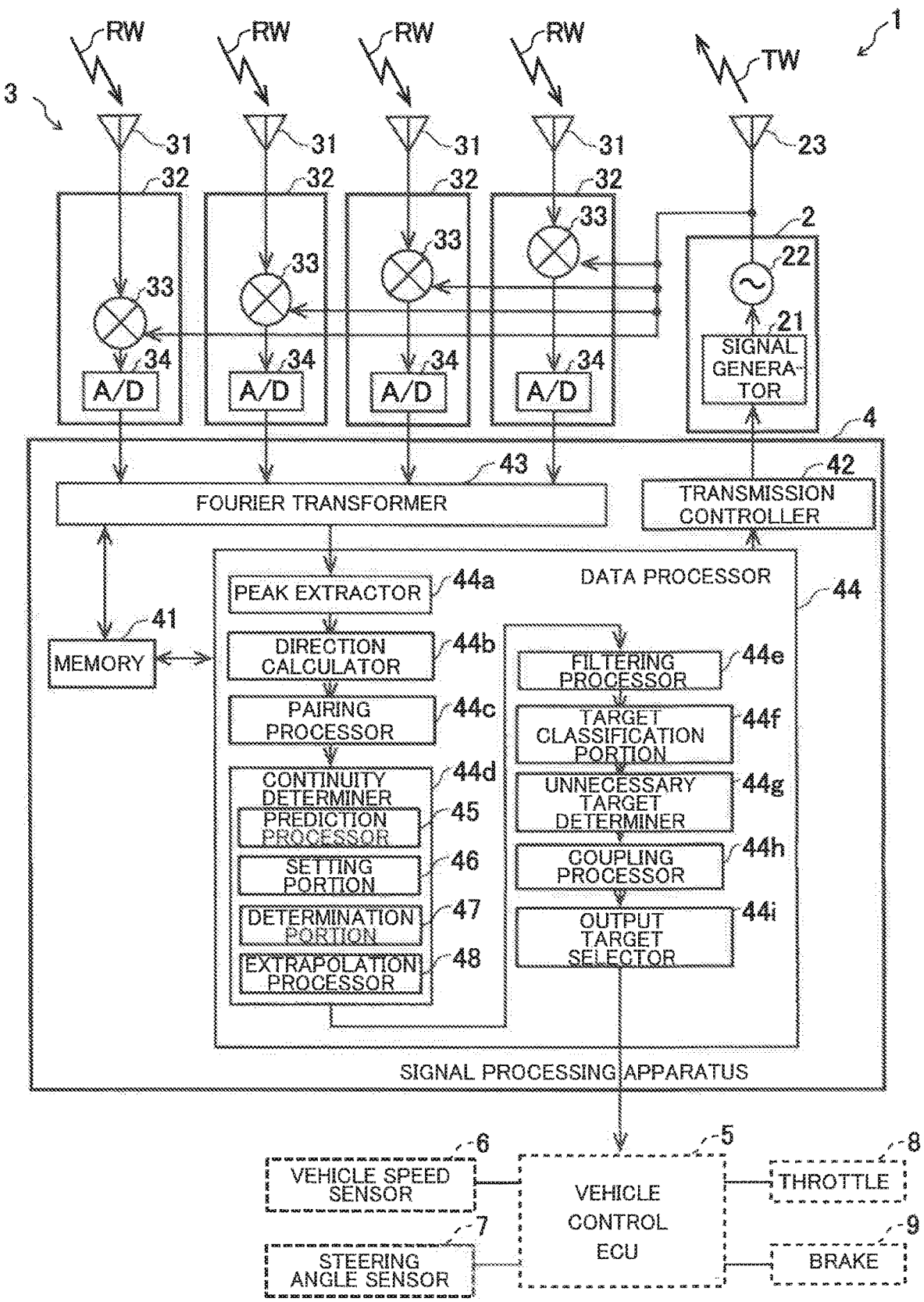
FIG. 1 illustrates a configuration example of a radar apparatus.

FIG. 1 illustrates a configuration of a radar apparatus 1 according to this embodiment. The radar apparatus 1 is, for example, mounted on a vehicle, such as a car. The vehicle on which the radar apparatus 1 is mounted is hereinafter referred to as "host vehicle". Moreover, a straight traveling direction of the host vehicle, which is a direction from a driver's seat toward a steering, is referred to as "front direction". A straight traveling direction of the host vehicle, which is a direction from the steering toward the driver's seat, is referred to as "back direction". A direction perpendicular to the straight traveling direction of the host vehicle and a vertical line, which is a direction from a right side toward a left side of a driver who faces forward, is referred to as "left direction". A direction perpendicular to the straight traveling direction of the host vehicle and the vertical line, which is a direction from the left side toward the right side of the driver who faces forward, is referred to as "right direction".

The radar apparatus 1, as an example, mounted on a left-side front part of the host vehicle. The radar apparatus 1 acquires a set of target data (hereinafter, referred to as "target data set") of a target existing in a left front side direction of the host vehicle by using an FMCW (Frequency Modulated Continuous Wave), which is a continuous wave modulated in frequency thereof.

The radar apparatus 1 derives the target data set including parameters, such as a distance (m) that is a traveling distance of a reflection wave from the target to a point at which the reflection wave is received by a receiving antenna of the radar apparatus 1 (hereinafter, referred to as "distance of the target"), a relative speed (km/h) of the target to the host vehicle, a distance (m) from the host vehicle to the target in a front-back direction of the host vehicle (hereinafter, referred to as "longitudinal position"), and a distance (m) from the host vehicle to the target in a left-right direction of the host vehicle (hereinafter, referred to as "lateral position"). As for the longitudinal position, for example, a position on which the radar apparatus 1 of the host vehicle is mounted is defined as 0 (zero). A distance in front of the host vehicle is expressed as a positive value and a distance in back of the host vehicle is expressed as a negative value. As for the lateral position, for example, the position on which the radar apparatus 1 of the host vehicle is mounted is expressed as 0 (zero). A distance on a right side of the host vehicle is expressed as a positive value and a distance on a left side of the host vehicle is expressed as a negative value.

Figure 14:
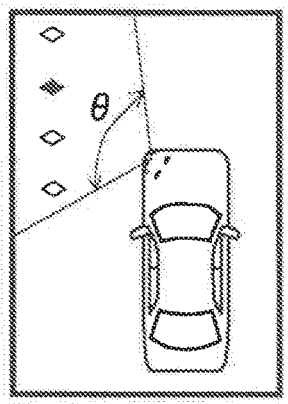
FIG. 14 is a bird's-eye view illustrating an example of a wrong tracking of the target.
Figure 14:
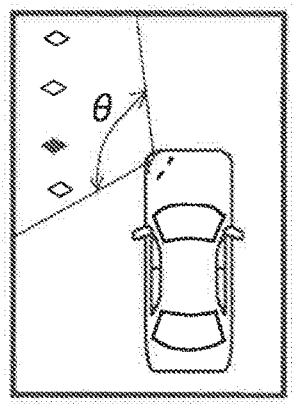
Figure 14:
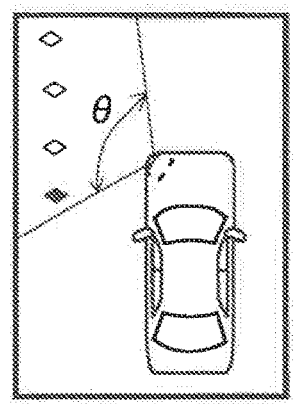
Figure 14:
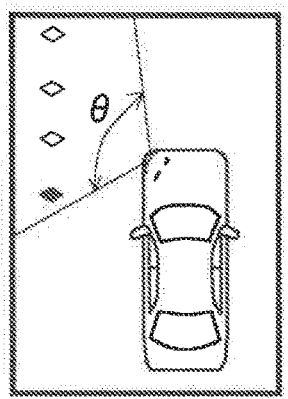
Figure 14:
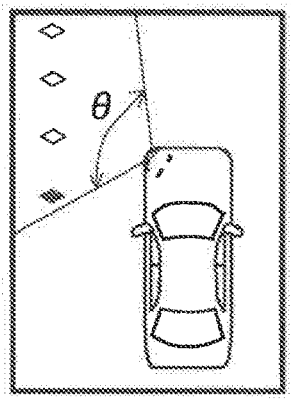
Figure 14:
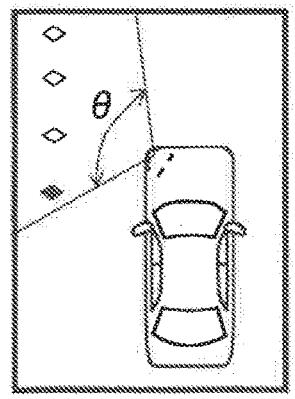

The radar apparatus 1 has a detection range (FOV). The FOV is a range in which the radar apparatus 1 can detect the target. In general, the radar apparatus 1 transmits a radio wave and receives the radio wave reflected by the target so that the FOV is defined as a three-dimensional range that is defined by a distance range in which the target can be detected, a horizontal angle range and a vertical angle range. In a front-side radar as described in the invention, a short-range target is a main attention target, a range of an angle, particularly, the horizontal angle range is important. Therefore, in the following, description will be made on an example of the FOV as a one-dimensional range defined only by the horizontal angle range. For example, a range of an angle θ in front of a radar apparatus is shown in FIG. 14. Even when the FOV as the three-dimensional range which includes the distance range and the vertical angle range is used, characteristics of the invention are not impaired.

As illustrated in FIG. 1, the radar apparatus 1 mainly includes a transmitter 2, a receiver 3 and a signal processing apparatus 4.

The transmitter 2 includes a signal generator 21 and an oscillator 22. The signal generator 21 generates a modulation signal in which voltage varies in a triangular waveform, and provides the modulation signal to the oscillator 22. The oscillator 22 modulates a frequency of a continuous wave signal based on the modulation signal generated by the signal generator 21, generates a transmission signal in which the frequency varies in accordance with elapse of time, and outputs the generated transmission signal to a transmission antenna 23.

The transmission antenna 23, based on the transmission signal from the oscillator 22, outputs a transmission wave TW in the left front side direction of the host vehicle. The transmission wave TW output by the transmission antenna 23 is the FMCW in which the frequency goes up and down in a predetermined cycle. The transmission wave TW transmitted in the left front side direction of the host vehicle from the transmission antenna 23 is reflected by an object, such as a human or another vehicle, and becomes a reflection wave RW.

The receiver 3 includes plural receiving antennas 31 that form an array antenna, and plural individual receivers 32 connected to the plural receiving antennas 31. In this embodiment, the receiver 3 includes, for example, four of the receiving antennas 31 and four of the individual receivers 32. The four individual receivers 32 correspond to the four receiving antennas 31, respectively. Each of the receiving antennas 31 acquires a reception signal by receiving the reflection wave RW from the object, and each of the individual receivers 32 processes the reception signal acquired by the corresponding receiving antennas 31.

Each of the individual receivers 32 includes a mixer 33 and an A/D converter 34. After the reception signal acquired by each of the receiving antennas 31 is amplified by a low noise amplifier (not illustrated), the amplified reception signal is sent to the mixer 33. The transmission signal is input to the mixer 33 from the oscillator 22 of the transmitter 2, and then the transmission signal and the reception signal are mixed by the mixer 33. Thus, a beat signal is generated. The beat signal has a beat frequency that is a frequency difference between the transmission signal and the reception signal. After the beat signal generated by the mixer 33 is converted into a digital signal by the A/D converter 34, the digital beat signal is output to the signal processing apparatus 4.

The signal processing apparatus 4 includes a microcomputer that has a CPU (Central Processing Unit), a memory 41, etc. The signal processing apparatus 4 stores various data for calculation in the memory 41, a storage device. An example of the memory 41 is a RAM (Random Access Memory). The signal processing apparatus 4 includes a transmission controller 42, a Fourier transformer 43 and a data processor 44 as functions implemented by software of the microcomputer. The transmission controller 42 controls the signal generator 21 of the transmitter 2.

The Fourier transformer 43 performs fast Fourier transformation (FFT) of the beat signal output from each of the plural individual receivers 32. Thus, the Fourier transformer 43 transforms the beat signal generated from the reception signal received by each of the plural receiving antennas 31 into a frequency spectrum that is data of a frequency range. The frequency spectrum acquired by the Fourier transformer 43 is input to the data processor 44.

As illustrated in FIG. 1, the data processor 44, as main functions, includes a peak extractor 44a, a direction calculator 44b, a pairing processor 44c, a continuity determiner 44d, a filtering processor 44e, a target classification portion 44f, an unnecessary target determiner 44g, a coupling processor 44h and an output target selector 44i.

The peak extractor 44a extracts a peak frequency corresponding to a peak value in a result of the fast Fourier transformation by the Fourier transformer 43, and outputs the extracted peak frequency to the direction calculator 44b. The peak extractor 44a extracts a peak frequency in an up period (period in which a frequency of the transmission wave TW goes up) and a peak frequency in a down period (period in which a frequency of the transmission wave TW goes down).

The direction calculator 44b estimates arriving angles of reflection waves corresponding to peak frequencies extracted by the peak extractor 44a, and calculates a signal strength (reception level) at each peak frequency.

The pairing processor 44c performs a correct combination of the peak frequencies in the up period and the down period based on a result of estimation and a result of calculation by the direction calculator 44b, and calculates the distance and the relative speed of each target from a result of the combination. The pairing processor 44c outputs information including an estimation angle, the distance and the relative speed of each target to the continuity determiner 44d.

The continuity determiner 44d determines whether or not there is a continuity between an instantaneous value of a currently detected target and a previously detected target. The continuity determiner 44d outputs information including a target data set after a continuity determination process to the filtering processor 44e. The continuity determiner 44d includes a prediction processor 45, a setting portion 46, a determination portion 47 and an extrapolation processor 48. Processes to be implemented by the prediction processor 45, the setting portion 46, the determination portion 47 and the extrapolation processor 48 will be described later in detail.

The filtering processor 44e performs a filtering process of each detected target data set to smooth a current instantaneous value and a prediction value, between which there is a continuity, by using a predetermined weight coefficient. That is, the following formula can be expressed. $\alpha$ is greater than 0 and smaller than 1.

Target data set after filtering process=$\alpha \times$ prediction value data+$(1-\alpha) \times$ instantaneous value data The filtering processor 44e outputs information including the target data set after the filtering process to the target classification portion 44f.

The target classification portion 44f classifies each target into one of a moving object and a stationary object based on a result of the filtering process, and the like. The target classification portion 44f outputs a result of classification to the unnecessary target determiner 44g.

The unnecessary target determiner 44g determines whether or not each target data set is unnecessary for system control. An unnecessary target data set is, for example, a phase folding ghost, a structural object, wall reflection, or the like. The target data set determined to be unnecessary by the unnecessary target determiner 44g is not basically output to an external apparatus, but may be retained inside the radar apparatus 1. The unnecessary target determiner 44g outputs information including the target data set that has not been determined to be unnecessary to the coupling processor 44h.

The coupling processor 44h groups, among plural target data sets the unnecessary target determiner 44g has not determined to be unnecessary, the target data sets which are estimated to have reflection points from a same object into one target data set, and outputs a result of grouping to the output target selector 44i.

The output target selector 44i selects a target data set that is required to be output to the external apparatus for the system control. The output target selector 44i outputs information including the selected target data set to the external apparatus.

The external apparatus is, for example, a vehicle control ECU 5. The vehicle control ECU 5 is electrically connected to a vehicle speed sensor 6, a steering angle sensor 7, a throttle 8 and a brake 9. The vehicle control ECU 5 performs vehicle control, for example, ACC (Adaptive Cruise Control), PCS (Pre-crash Safety System), and the like, based on target information acquired from the radar apparatus 1.

2. Operation of Signal Processing Apparatus

Figure 2:
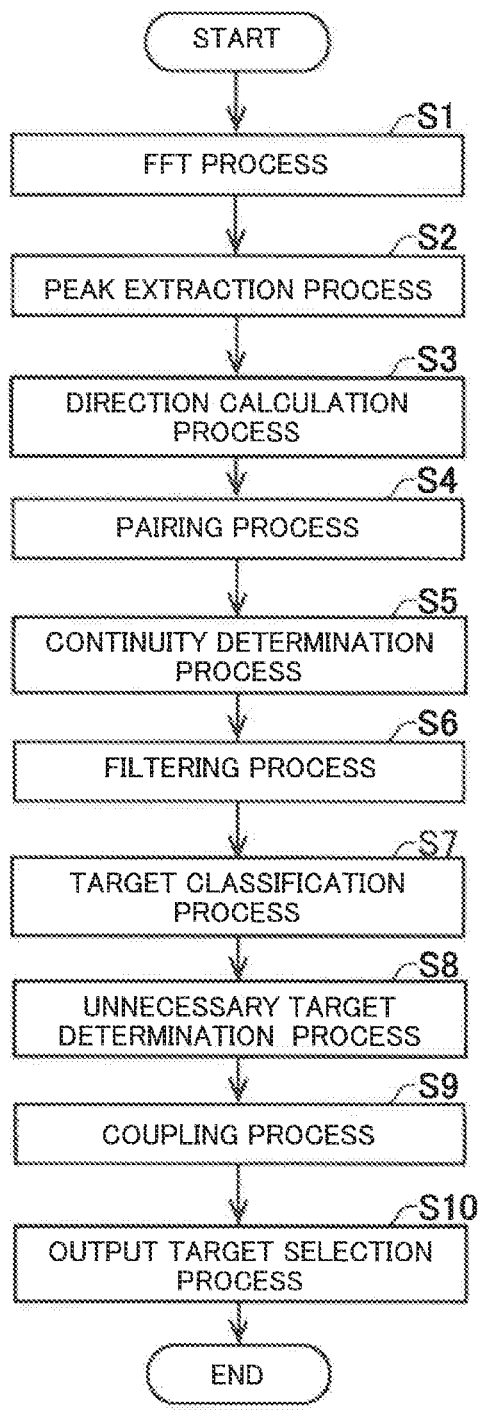
FIG. 2 is a flowchart illustrating operations of a signal processing apparatus.

Next, operations of the signal processing apparatus 4 will be described. FIG. 2 is a flowchart illustrating the operations of the signal processing apparatus 4. The signal processing apparatus 4 repeats processes shown in FIG. 2 in a predetermined time cycle (e.g., $\frac{1}{20}$ second cycle).

Prior to a start of the processes shown in FIG. 2, control of the signal generator 21 by a transmission controller 42 is completed. First, the Fourier transformer 43 performs the fast Fourier transformation of the beat signal output from each of the plural individual receivers 32 (a step S1). The frequency spectrums in the up period and the down period based on each of the reception signals received by the four receiving antennas 31 are input to the data processor 44 from the Fourier transformer 43.

Next, the peak extractor 44a extracts peak frequencies from the frequency spectrums (a step S2). The peak extractor 44a extracts, as the peak frequencies from the frequency spectrums, frequencies corresponding to peaks that have powers greater than a predetermined threshold.

Next, in the direction calculation process, the direction calculator 44b estimates angles of targets associated with signals of the extracted peak frequencies. The direction calculator 44b derives plural angles and powers of the signals (signal power) at the plural angles from one peak frequency of a signal (hereinafter, referred to as "peak signal). A well-known direction calculation process, such as ESPRIT, MUSIC or PRISM, is used as the direction calculation process.

Figure 3:
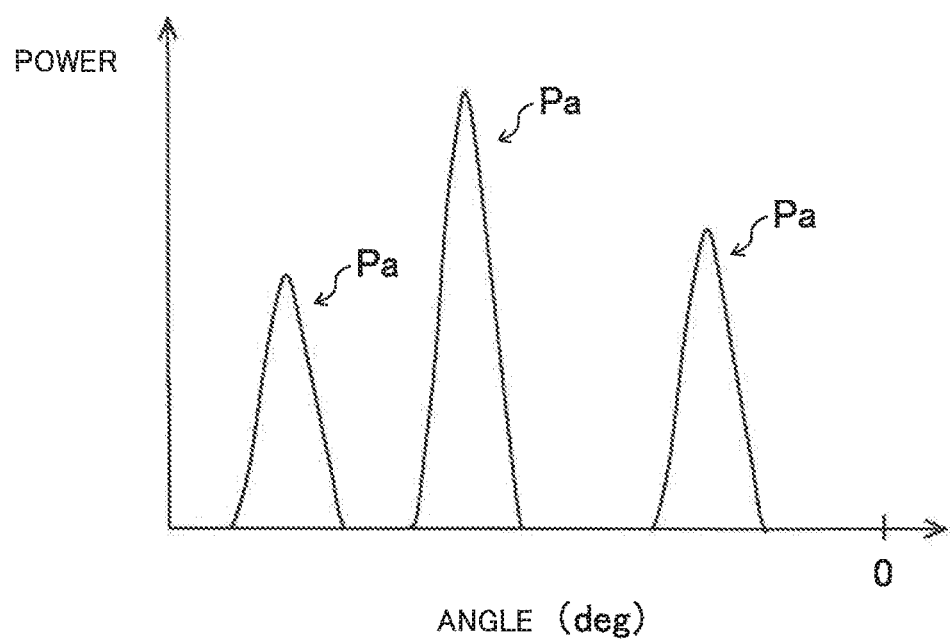
FIG. 3 illustrates an example of peak angles.

FIG. 3 is a conceptual illustration of an angle spectrum of the angles estimated in the direction calculation process. In FIG. 3, a horizontal axis represents angle (degree), and a vertical axis represents signal power. The angle (degree) is formed by a forward straight traveling direction of the host vehicle and a direction heading from the radar apparatus 1 to the target. For example, when the target exists on a front right side of the host vehicle, the distance from the host vehicle to the target is expressed as a positive value. When the target exists on a front left side of the host vehicle, the distance from the host vehicle to the target is expressed as a negative value. As for the lateral position, for example, the position on which the radar apparatus 1 of the host vehicle is mounted is expressed as 0 (zero). A distance on a right side of the host vehicle is expressed as a positive value and a distance on a left side of the host vehicle is expressed as a negative value. A peak Pa in the angle spectrum shown in FIG. 3 shows an angle estimated in the direction calculation process. The angle estimated in the direction calculation process is hereinafter referred to as "peak angle". The signal power at the peal angle is referred to as "angle power". As described above, plural peak angles concurrently derived from one peak signal show angles of plural targets existing at a same distance from the radar apparatus 1 (distance corresponding to the peak frequency).

The pairing processor 44c derives a peak angle and an angle power of each of the plural targets existing at the same distance from the radar apparatus 1. Thus, the pairing processor 44c derives data sets of the periods (hereinafter referred to as "period data set") of the plural targets existing in the left front side direction of the host vehicle. The pairing processor 44c derives the period data sets of the up period and the down period (hereinafter referred to respectively as "up-period data set" and "down-period data set"), each of which includes parameters of the peak frequency, the peak angle, and the angle power. The pairing processor 44c pairs the up-period data sets with the down-period data sets to perform a correct combination of the peak frequencies in the up period and the down period (a step S4). The pairing processor 44c pairs one of the up-period data sets with one of the down-period data sets, each of which has similar parameters (peak frequency, peak angle, and signal power) based on calculation, for example, that uses Mahalanobis distance.

The continuity determiner 44d performs the continuity determination process based on a result of a pairing process (a step S5). Then, the filtering processor 44e performs the filtering process based on a result of the continuity determination process (a step S6).

Subsequently, the target classification portion 44f performs a target classification process based on the result of the filtering process (a step S7). Then, the unnecessary target determiner 44g performs an unnecessary target determination process based on a result of the target classification process (a step S8).

The coupling processor 44h performs a coupling process based on a result of the unnecessary target determination process (a step S9). Finally, the output target selector 44i performs an output target selection process based on a result of the coupling process (a step S8), outputs information including a target data set selected to be output to the external apparatus, and ends the process.

In this embodiment, an example in which it is assumed that each functional portion, such as a Fourier transformer, is implemented by software of the microcomputer is described. However, the invention is not limited thereto. The microcomputer may include another CPU, or another processing device, such as a DCP (Digital Signal Processor), a GPU (Graphics Processing Unit), or the like, and another processing device may partially perform the process.

Functions of hardware may be entirely or partially implemented by a dedicated processing device, such as an ASIC (Application Specific Integrated Circuit), a programmable processing device, such as an FPGA (Field Programmable Gate Array) or CPLD (Complex Programmable Logic Device).

In such a configuration, since each function may be operated in parallel, it is not always necessary to perform the process according to a process category or a time series in the flowchart shown in the drawing. For example, it is also possible to form a pipeline with a single set of processing data in units of antennas or up/down periods.

A case in which the Fourier transformer 43 and the peak extractor 44a are implemented as hardware will be described as an example. First, the Fourier transformer 43 performs a Fourier transformation of the up-period data set. After the transformation is ended, a result of the Fourier transformation of the up-period data set is sent to the peak extractor 44a. Next, the Fourier transformer 43 starts the Fourier transformation of the down-period data set. Concurrently, the peak extractor 44a starts a peak extraction of the result of Fourier transformation of the up-period data set. In this example, when it is assumed that both of the up-period data set and the down-period data set are deemed as a single data set, execution of the step S1 and the step S2 chronologically overlaps with each other. In other words, the next step S2 is started without waiting for an end of the step S1.

In addition to the pipeline described above, such a specific configuration of parallel operations includes various known methods, such as speculative execution for executing a process after conditional branching before determining branch conditions, and the like. When each functional portion is implemented by another processing device other than the CPU, with such a configuration, it is possible to reduce unoccupied hours of operations of each functional portion and accelerate a speed of processing.

3. First Example of Continuity Determination Process

Figure 4:
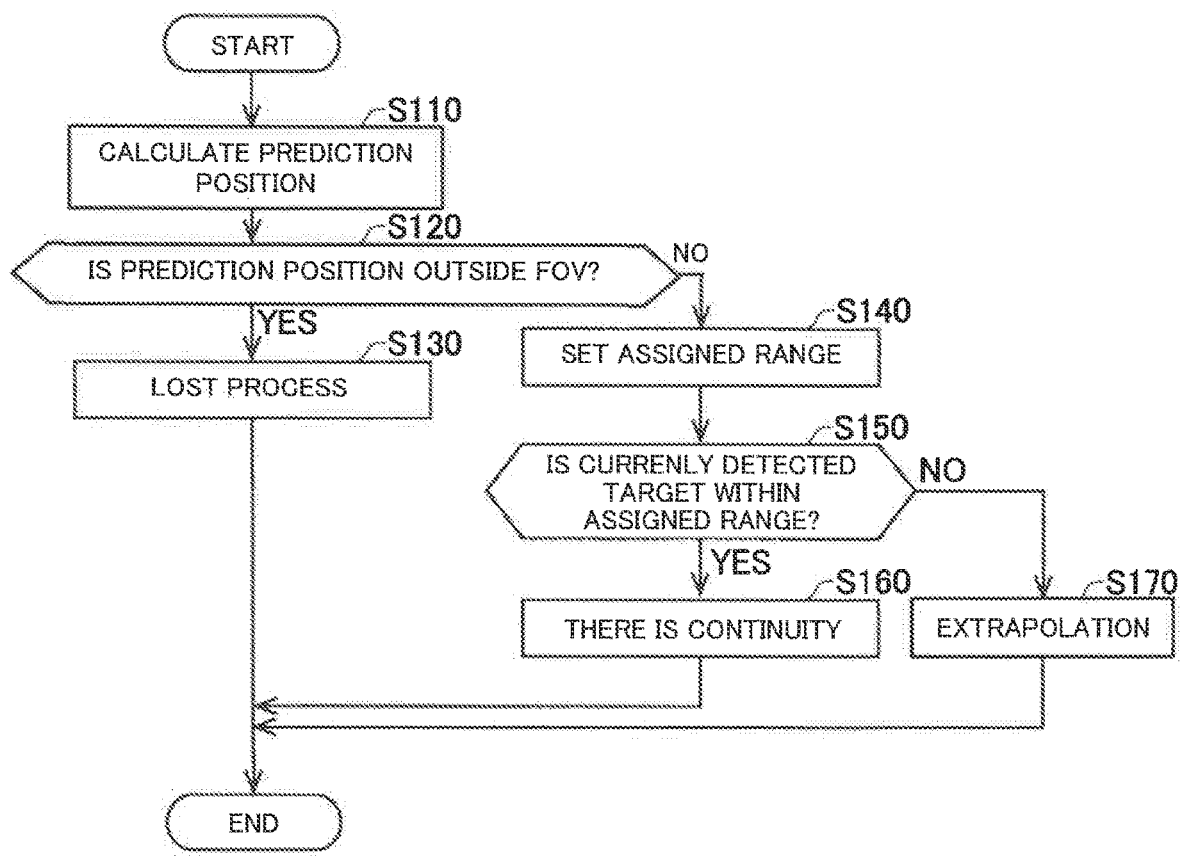
FIG. 4 is a flowchart illustrating an outline of a first example of a continuity determination process.

FIG. 4 is a flowchart illustrating an outline of a first example of a continuity determination process. The process of the flowchart shown in FIG. 4 is implemented for a previously detected target and a previously extrapolated target, respectively.

First, a prediction processor 45 calculates a prediction position of a previously detected target or a previously extrapolated target (hereinafter, referred to as "previous target") in a current detection (a step S110). Specifically, the prediction processor 45 estimates a current position based on a position and a relative speed of a previous target data set.

Next, a determination portion 47 determines whether or not the prediction position is outside FOV (a step S120).

When the prediction position is outside the FOV (Yes in the step S120), the determination portion 47 performs a lost process (a step S130). Specifically, the determination portion 47 determines that a same target as the previously detected target has not been currently detected, and deletes the prediction position from a memory 41. Thus, a radar apparatus 1 can prevent a wrong tracking shown in FIG. 14. When a process in the step S130 is completed, operations of the flowchart shown in FIG. 4 are ended.

On the other hand, when the prediction position is within the FOV (No in the step S120), a setting portion 46 sets an assigned range including the prediction position (a step S140). The assigned range may be, for example, a rectangle whose center of gravity is the prediction position in a two-dimensional plane in which a host vehicle is shown from a bird's-eye view.

When a currently detected target is within the assigned range (Yes in a step S150), a continuity determiner 44d determines that there is a continuity between the currently detected target and the previous target (that is, the same target) (a step S160). When a process in the step S160 is completed, the operations of the flowchart shown in FIG. 4 are ended. When the currently detected target within the assigned range is also within another assigned range, and is assigned to another assigned range, the process may move to a step S170 instead of the step S160.

On the other hand, when the currently detected target is not within the assigned range (No in the step S150), an extrapolation processor 48 performs an extrapolation (the step S170). Specifically, the extrapolation processor 48 determines that the same target as the previously detected target exists in the prediction position. The prediction position that is used in the extrapolation is not deemed as an instantaneous value of a target in a filtering process by a filtering processor 44e. When a process in the step S170 is completed, the operations of the flowchart shown in FIG. 4 are ended.

When a predetermined number of times of the extrapolation are consecutively performed, the lost process may be executed. When there is no continuity between the currently detected target and all of the previously detected targets and the previously extrapolated targets, the currently detected target is a new target.

4. Second Example of Continuity Determination Process

Figure 5:
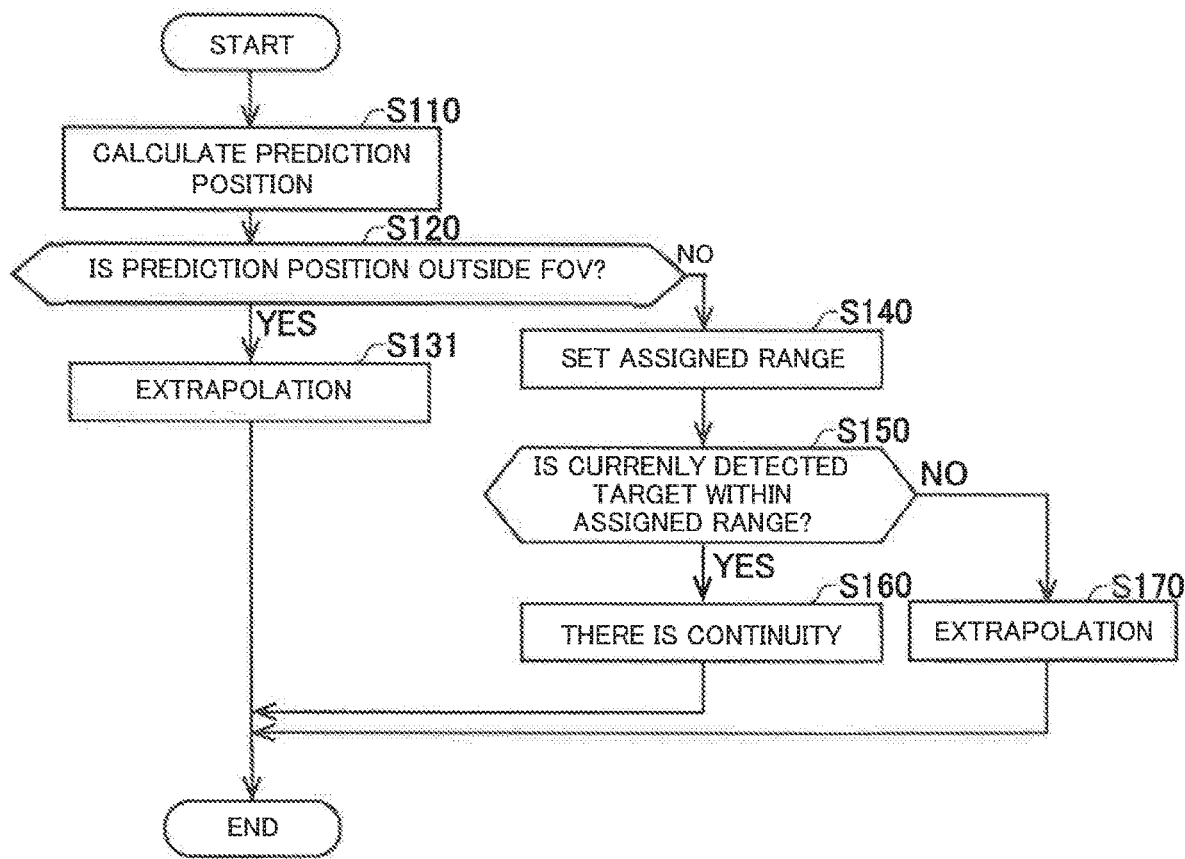
FIG. 5 is a flowchart illustrating an outline of a second example of the continuity determination process.

FIG. 5 is a flowchart illustrating an outline of a second example of a continuity determination process. The flowchart shown in FIG. 5 is obtained by replacing the step S130 with a step S131 in the flowchart shown in FIG. 4.

In the step S131, an extrapolation processor 48 performs an extrapolation. Specifically, the extrapolation processor 48 determines that a same target as a previously detected target exists in a prediction position. The prediction position that is used in the extrapolation is not deemed as an instantaneous value of a target in a filtering process by a filtering processor 44e. When the extrapolation in the step S131 is completed, operations of the flowchart shown in FIG. 5 are ended.

That is, in the flowchart shown in FIG. 5, when the prediction position is outside FOV (Yes in the step S120), the extrapolation in the step S131 is performed. Thus, a radar apparatus 1 can prevent a wrong tracking shown in FIG. 14.

5. Third Example and Fourth Example of Continuity Determination Process

When a host vehicle is traveling at a low speed or the host vehicle is being parked, there are cases in which a traveling direction of the host vehicle greatly changes and a target whose prediction position in a current detection has been outside FOV moves into the FOV with this change. Therefore, when the host vehicle is traveling at a low speed or the host vehicle is being parked, it is possible to track a target more suitably by performing an extrapolation in the step S131 rather than performing a lost process in the step S130.

Therefore, in a third example of a continuity determination process, when a speed of the host vehicle exceeds a predetermined value, a continuity determiner 44d executes operations of the flowchart shown in FIG. 4, and when the speed of the host vehicle is equal to or lower than the predetermined value, the continuity determiner 44d executes operations of the flowchart shown in FIG. 5. The continuity determiner 44d may receive speed information of the host vehicle, for example, from a vehicle control ECU 5.

In a fourth example of the continuity determination process, when the host vehicle is not being parked, the continuity determiner 44d executes the operations of the flowchart shown in FIG. 4, and when the host vehicle is being parked, the continuity determiner 44d executes the operations of the flowchart shown in FIG. 5. The continuity determiner 44d may receive host vehicle's behavior, for example, from the vehicle control ECU 5, and determine whether or not the host vehicle is being parked based on the host vehicle's behavior. When the vehicle control ECU 5 performs autonomous driving control, the continuity determiner 44d may receive information related to the autonomous driving control from the vehicle control ECU 5, and determine whether or not the host vehicle is being parked based on the information related to the autonomous driving control.

6. Fifth Example of Continuity Determination Process

Figure 6:
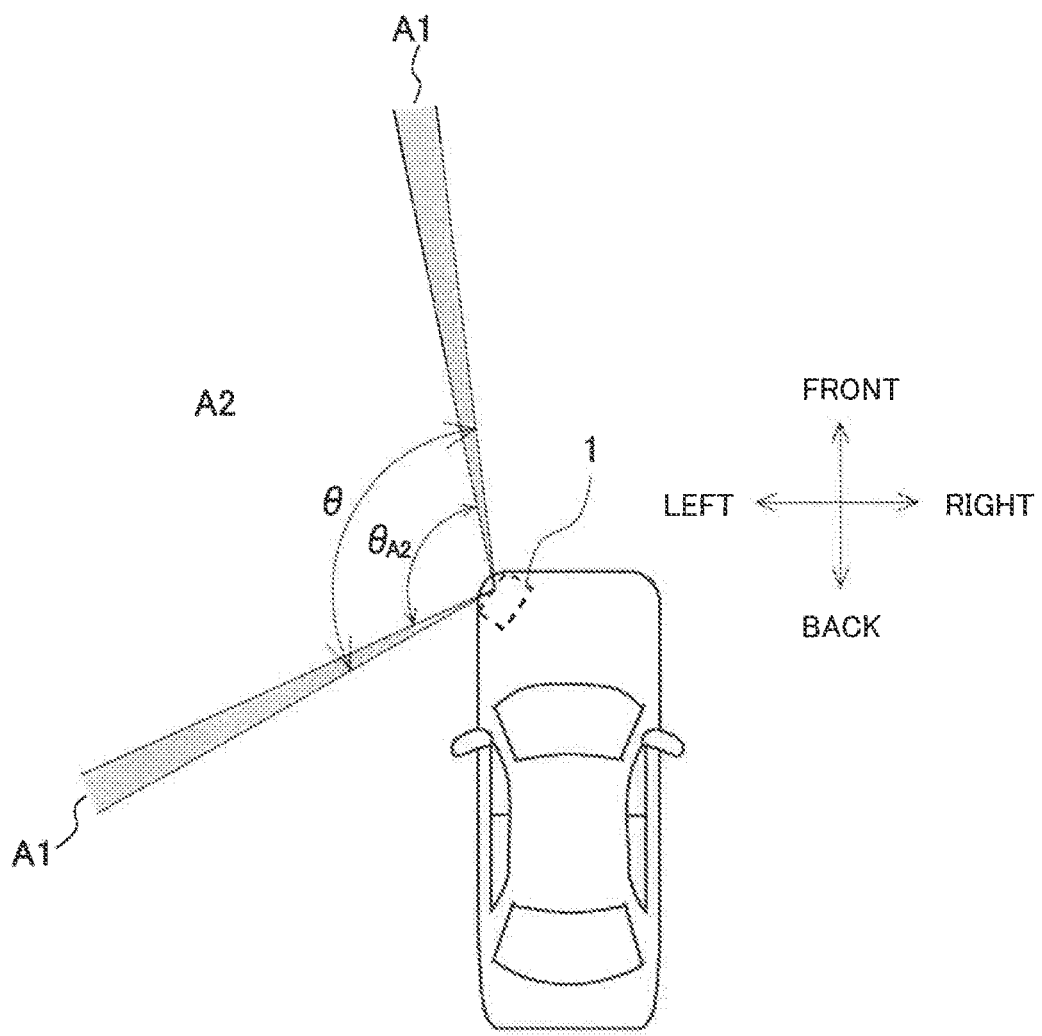
FIG. 6 is a bird's-eye view illustrating FOV and a limited range of the radar apparatus.
Figure 8:
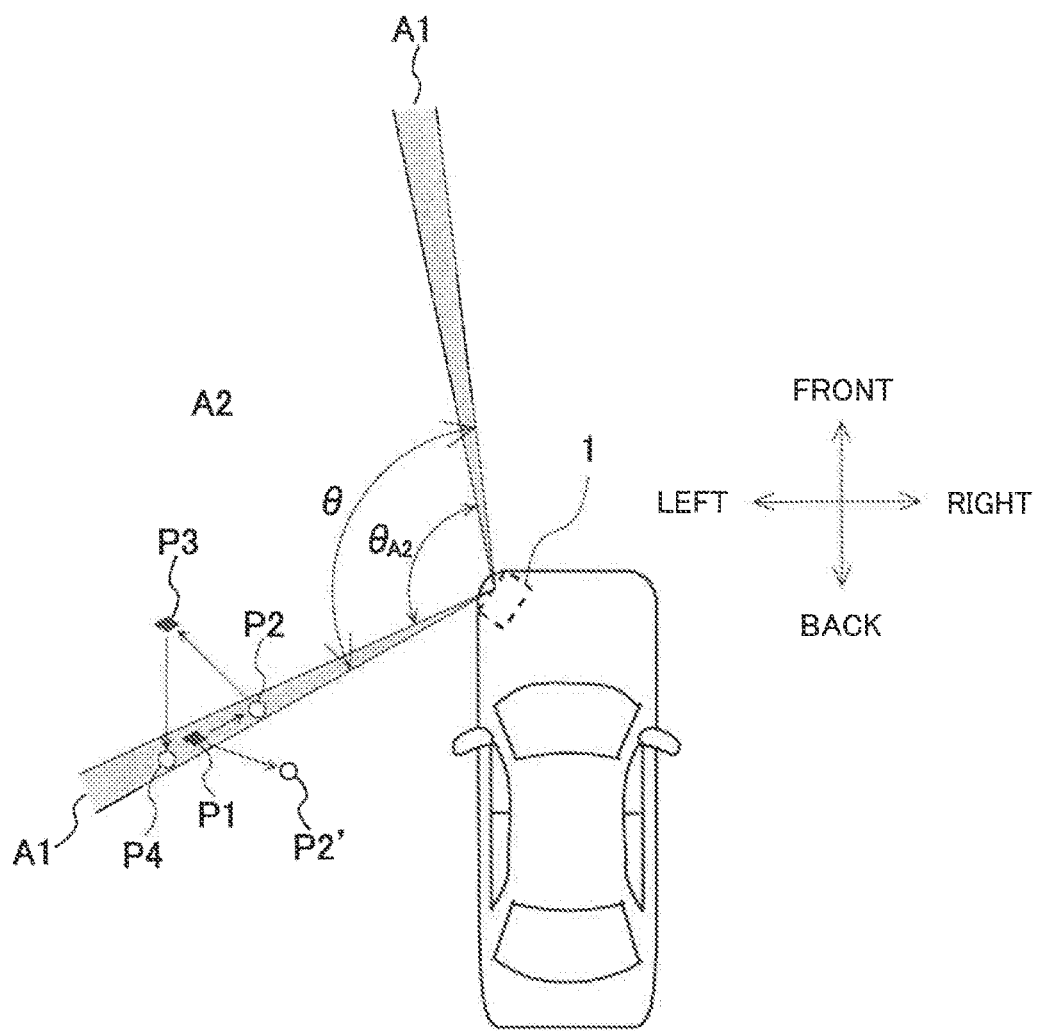
FIG. 8 is a bird's-eye view illustrating an instantaneous value and a prediction position of a target.
Figure 9:
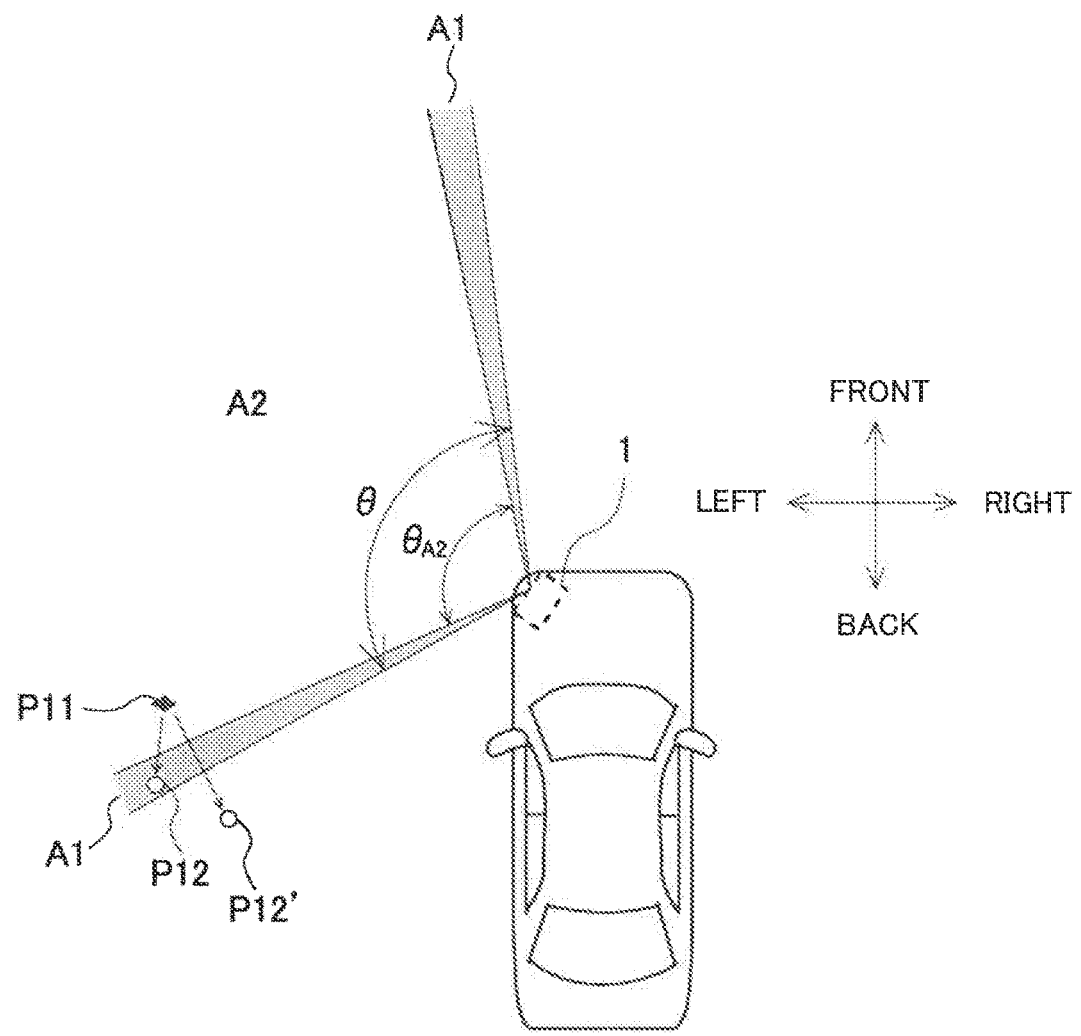
FIG. 9 is a bird's-eye view illustrating the instantaneous value and the prediction position of the target.

Even within FOV, since there is a range in which a target is difficult to be detected near a border between an inside of the FOV and an outside of the FOV, it is recommended that such a range be deemed to be outside the FOV. Then, in a fifth example of a continuity determination process, a continuity determiner 44d, even within the FOV, deems a predetermined range A1 (a shaded part in FIG. 6) near the border between the inside of the FOV and the outside of the FOV to be outside the FOV. In the fifth example of the continuity determination process, the continuity determiner 44d, for example, executes operations of the flowchart shown in FIG. 5. However, a range of "FOV" in the step S120 decreases by the "predetermined range A1". That is, in the step S120, it is determined whether or not a prediction position is outside a limited range A2. The limited range A2 is obtained by excluding the predetermined range A1 from the FOV. In FIG. 6, and FIG. 8 and FIG. 9 described later, a range of an angle θ A2 is within the limited range A2.

7. Sixth Example of Continuity Determination Process

In a sixth example of a continuity determination process, in a similar manner to the fifth example of the continuity determination process, a continuity determiner 44d, even within the FOV, deems a predetermined range A1 (a shaded part in FIG. 6) near a border between an inside of FOV and an outside of the FOV to be outside the FOV.

In the fifth example of the continuity determination process, even in a state in which a new target within the predetermined range A1 (the shaded part in FIG. 6) near the border between the inside of FOV and the outside of the FOV can be detected, the new target is not detected. Therefore, when the new target moves into a limited range A2 obtained by excluding the predetermined range A1 from the FOV, detection of the new target will be delayed.

In order to prevent such a detection delay of the new target, in the sixth example of the continuity determination process, as for a target newly detected within the predetermined range A1, the continuity determiner 44d does not deem the predetermined range A1 to be outside the FOV exceptionally before the target newly detected within the predetermined range A1 moves into the limited range A2. In the sixth example of the continuity determination process, a limited range entry flag is prepared for a target data set of a target, and the continuity determiner 44d executes operations of the flowchart shown in FIG. 7. When once the target has entered the limited range A2, the continuity determiner 44d turns on the limited range entry flag. When the target has never entered the limited range A2, the continuity determiner 44d turns off the limited range entry flag.

Figure 7:
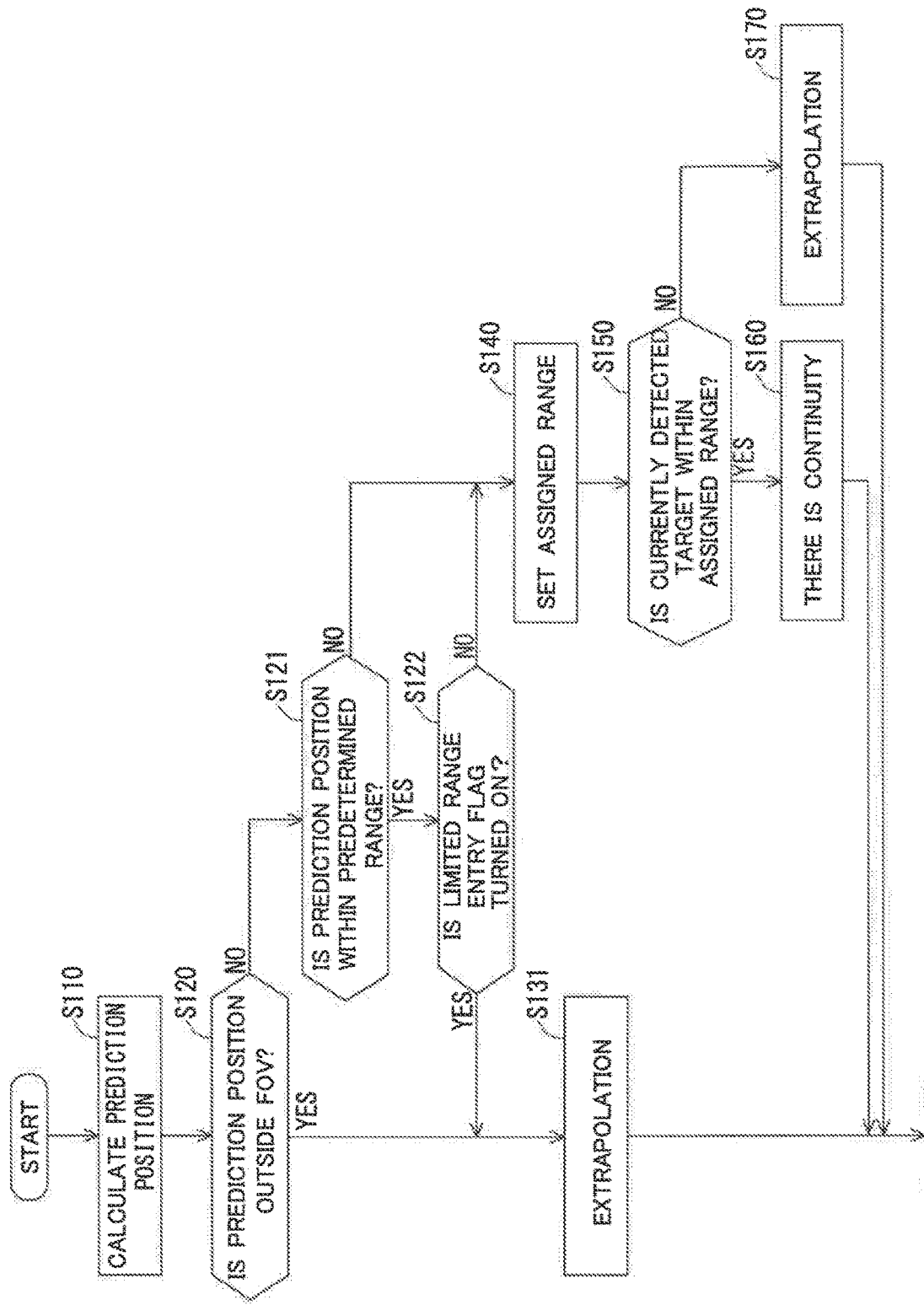
FIG. 7 is a flowchart illustrating an outline of a third example of the continuity determination process.

The flowchart shown in FIG. 7 is obtained by adding a step S121 and a step S122 to the flowchart shown in FIG. 5. In the sixth example of the continuity determination process, different from the fifth example of the continuity determination process, a range of "FOV" in the step S120 does not decrease. That is, in the step S120, it is determined whether or not a prediction position is outside a range which is a range of an angle θ. Points different from FIG. 5 in the flowchart shown in FIG. 7 will be described below.

When a determination portion 47 determines that the prediction position of a previous target in a current detection is not outside the FOV (No in the step S120), the determination portion 47 determines whether or not the prediction position of the previous target in the current detection is within the predetermined range A1 (the step S121). When the prediction position of the previous target in the current detection is within the predetermined range A1 (Yes in the step S121), the process moves to the step S122. On the other hand, when the prediction position of the previous target in the current detection is not within the predetermined range A1 (No in the step S121), the process moves to the step S140.

In the step S122, the continuity determiner 44d checks whether or not the limited range entry flag of the previous target is turned on. When the limited range entry flag of the previous target is turned on (Yes in the step S122), the process moves to the step S131. On the other hand, the limited range entry flag of the previous target is turned off (No in the step S122), the process moves to the step S140.

For example, as illustrated in FIG. 8, when an instantaneous value P1 of the new target is detected within the predetermined range A1 and a next prediction position P2 is also within the predetermined range A1, a determination result in the step S121 in FIG. 7 is "Yes", and the process moves to the step S122 in FIG. 7. At this time, since the limited range entry flag (hereinafter, referred to as "flag") is turned off, a determination result in the step S122 in FIG. 7 is "No", the process moves to the step S140 in FIG. 7, and the continuity determiner 44d performs a normal continuity determination.

Then, as illustrated in FIG. 8, when an instantaneous value P3 of a target for which a continuity determination has been performed enters the limited range A2, the flag is turned on. After the flag has turned on, when a prediction position P4 moves into the predetermined range A1, the determination result in the step S121 in FIG. 7 is "Yes", and the process moves to the step S122 in FIG. 7. At this time, since the flag is turned on, the determination result in the step S122 in FIG. 7 is "Yes", the process moves to the step S131, and an extrapolation processor 48 forcibly performs an extrapolation.

On the other hand, as illustrated in FIG. 8, when the instantaneous value P1 of the new target is detected within the predetermined range A1, and a next prediction position P2' is outside the FOV, a determination result in the step S120 in FIG. 7 is "Yes", the process moves to the step S131 in FIG. 7, and the extrapolation processor 48 forcibly performs the extrapolation.

Moreover, for example, as illustrated in FIG. 9, when an instantaneous value P11 of the new target is detected within the limited range A2 and a next prediction position P12 is within the predetermined range A1, the determination result in the step S121 in FIG. 7 is "Yes" and the process moves to the step S122 in FIG. 7. At this time, since the flag is turned on, the determination result in the step S122 in FIG. 7 is "Yes", the process moves to the step S131 in FIG. 7, and the extrapolation processor 48 forcibly performs the extrapolation.

On the other hand, as illustrated in FIG. 9, when the instantaneous value P11 of the new target is detected within the limited range A2 and a next prediction position P12' is outside the FOV, the determination result of the step S120 in FIG. 7 is "Yes", the process moves to the step S131, and the extrapolation processor 48 forcibly performs the extrapolation.

8. Seventh Example of Continuity Determination Process

Figure 10:
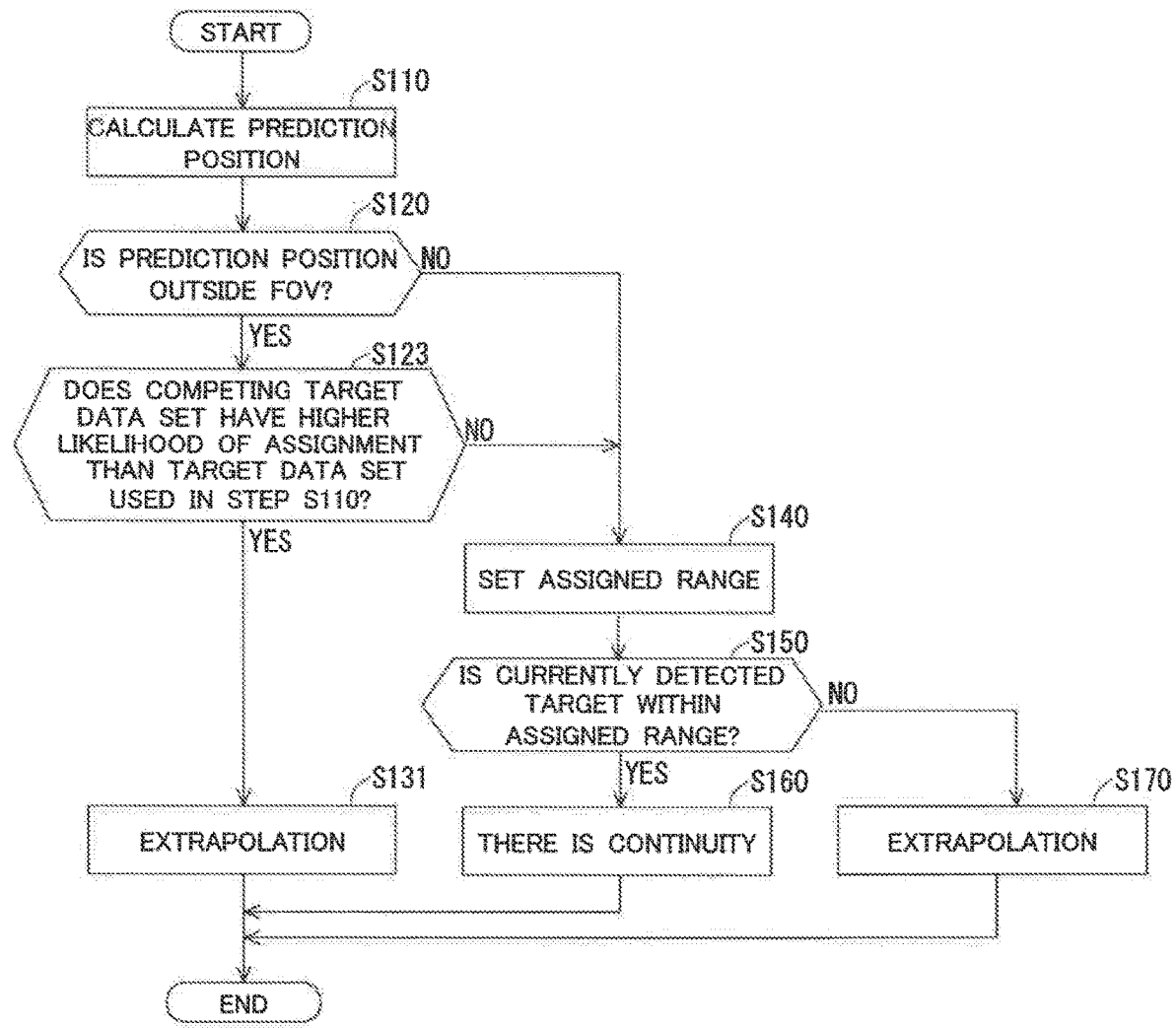
FIG. 10 is a flowchart illustrating an outline of a fourth example of the continuity determination process.

In a seventh example of a continuity determination process, a continuity determiner 44d executes operations of the flowchart shown in FIG. 10. The flowchart shown in FIG. 10 is obtained by adding a step S123 to the flowchart shown in FIG. 5.

When a determination portion 47 determines that a prediction position of a previous target in a current detection is outside FOV (Yes in the step S120), the continuity determiner 44d checks whether or not a competing target data set has a higher likelihood of assignment than a target data set used in the step S110 (the step S123). When the competing target data set has a higher likelihood of assignment than the target data set used in the step S110, the process moves to the step S131. When the competing target data set does not have a higher likelihood of assignment than the target data set used in the step S110, the process moves to the step S140. "The competing target data set has a higher likelihood of assignment than the target data set used in the step S110" means that a statistical distance (e.g., Mahalanobis distance) between a prediction position of a competing target different from a target used for calculation in the step S110 and a currently detected target is shorter than a distance between a prediction position calculated in the step S110 and the currently detected target. That is, a high likelihood of assignment is comprehensively determined by not only a short Euclidean distance but also a small difference in a relative speed between a target corresponding to a prediction position and an instantaneous value of the currently detected target and a small difference in receiving power. As a representative example, the Euclidean distance will be hereinafter described.

Figure 11:
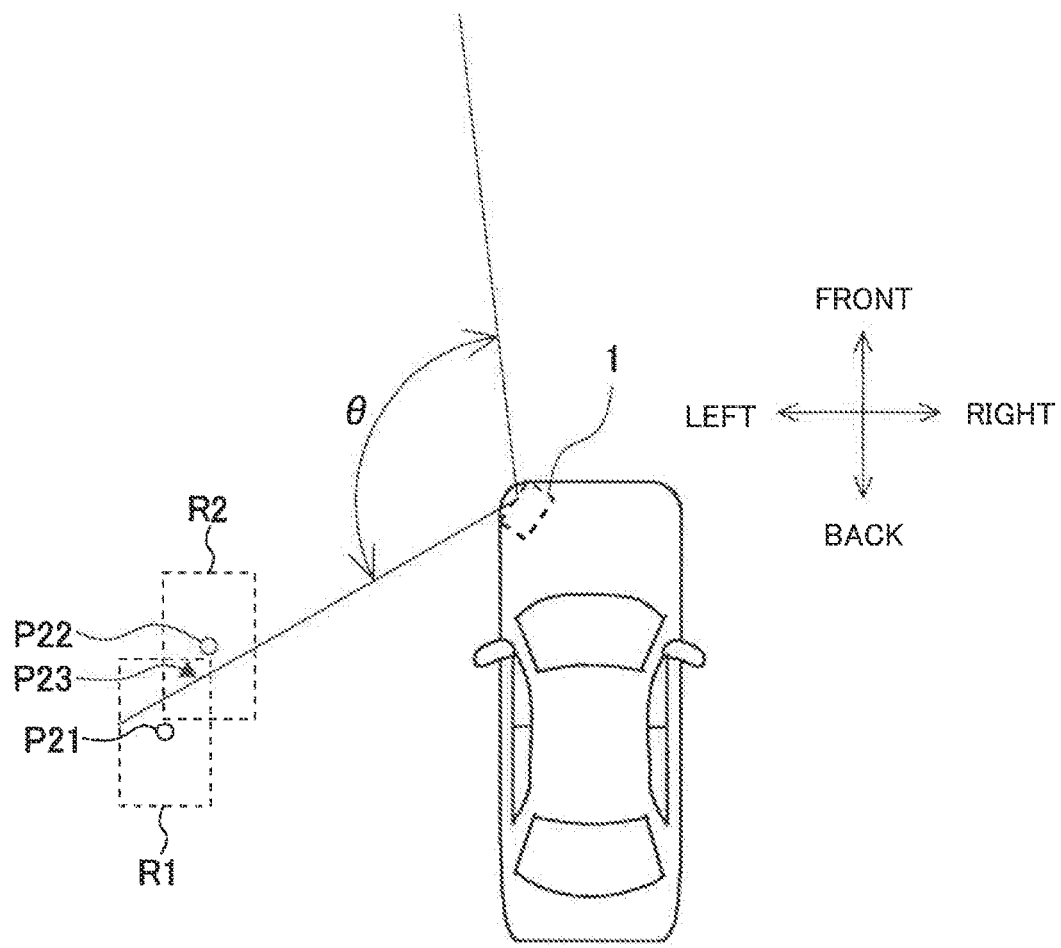
FIG. 11 is a bird's-eye view illustrating the instantaneous value and the prediction position of the target.
Figure 12:
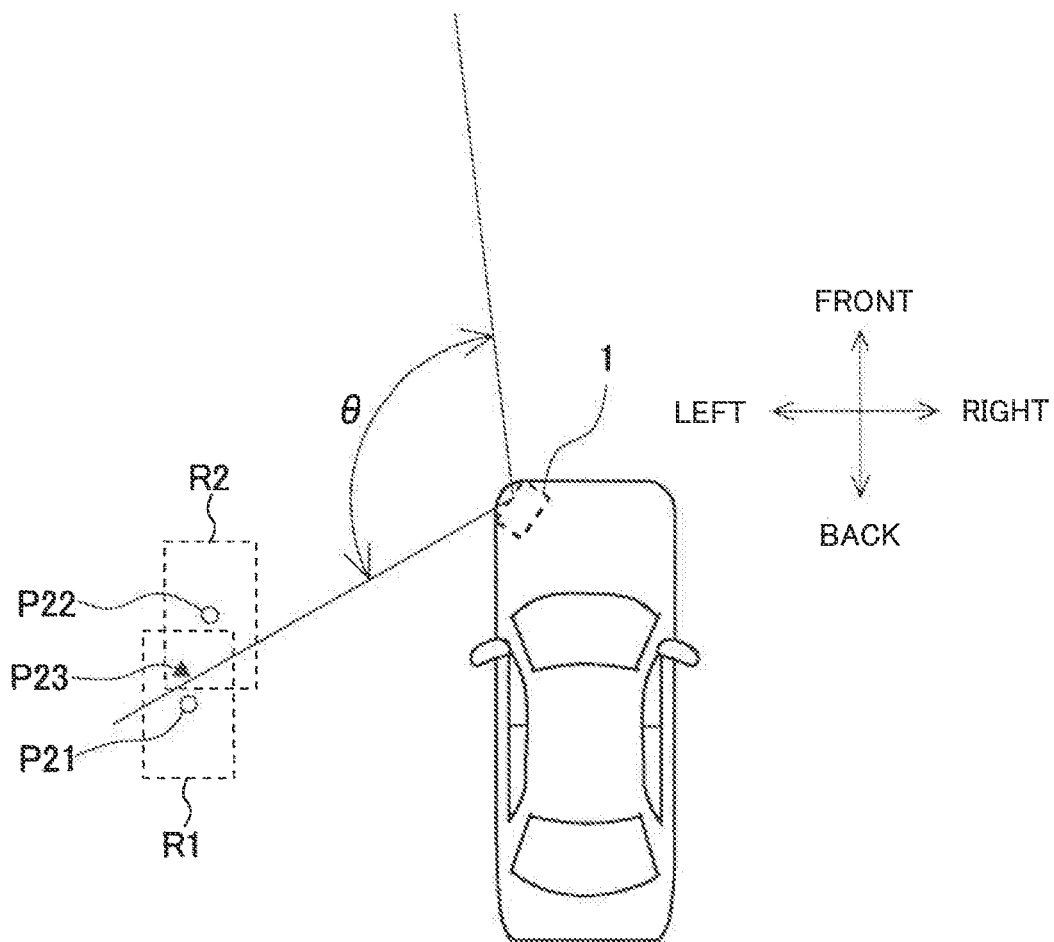
FIG. 12 is a bird's-eye view illustrating the instantaneous value and the prediction position of the target.

Here, as illustrated in FIG. 11 and FIG. 12, a situation in which a first prediction position P21 that corresponds to a prediction position of a first target (used for calculation in the step S110 in FIG. 10) is outside the FOV, a second prediction position P22 that corresponds to a prediction position of a second target (the competing target) is within the FOV, and an instantaneous value P23 of the currently detected target exists within an assigned range R1 including the first prediction position P21 and an assigned range R2 including the second prediction position P22 will be considered.

In the above described situation, as illustrated in FIG. 11, when the instantaneous value P23 of the currently detected target is closer to the second prediction position P22 than the first prediction position P21, a determination result in the step S123 in FIG. 10 is "Yes", the process moves to the step S131 in FIG. 10, and an extrapolation processor 48 forcibly performs an extrapolation. On the other hand, in the above described situation, as illustrated in FIG. 12, when the instantaneous value P23 of the currently detected target is closer to the first prediction position P21 than the second prediction position P22, the determination result in the step S123 in FIG. 10 is "No", the process moves to the step S140 in FIG. 10, and the continuity determiner 44d performs a normal continuity determination. Thus, only when the instantaneous value P23 of the currently detected target is closer to the second prediction position P22 than the first prediction position P21, the determination portion 47 determines that a same target as the first target has not been currently detected. As a result, for example, when there is a guardrail on a left side of a host vehicle, it is possible to completely track the second target (the competing target) remaining within the FOV among targets that correspond to the guardrail, as well as to prevent a wrong tracking of the first target moving out of the FOV among the targets that correspond to the guardrail.

Figure 13:
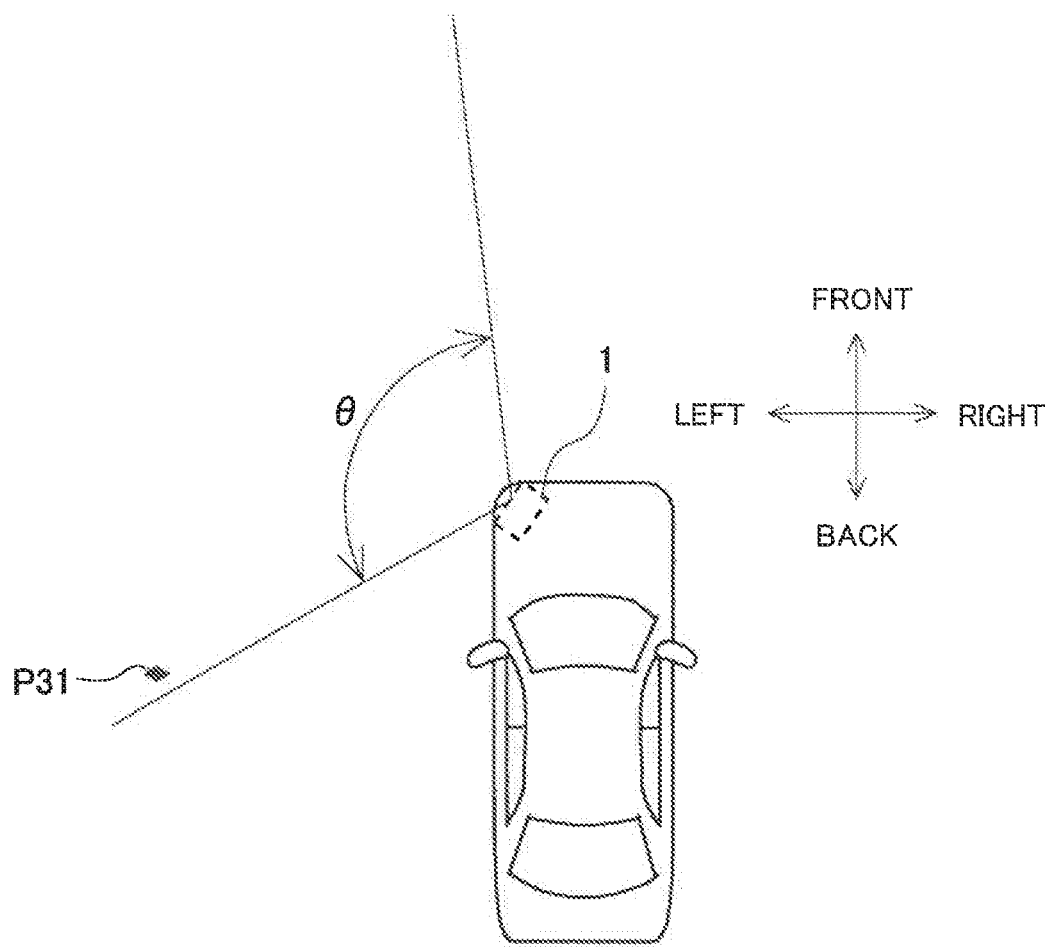
FIG. 13 is a bird's-eye view illustrating the instantaneous value of the target.

For example, different from FIG. 11 and FIG. 12, as illustrated in FIG. 13, when an instantaneous value P31 of the first target (used for calculation in the step S110) has been detected within the FOV, but no instantaneous value of the second target (the competing target) has been detected, since the second target (the competing target) does not exists, the determination result in the step S123 in FIG. 10 is "No", the process moves to the step S140 in FIG. 10, and the continuity determiner 44d performs a normal continuity determination. Thus, for example, even when another vehicle stays traveling in parallel on the left side of the host vehicle, it is possible to track targets that correspond to another vehicle.

<Others>

In the meantime, the various technical features disclosed in the present specification are able to be modified in various ways without departing from the spirit of the technical creation besides the above embodiments. The embodiments and the modifications disclosed in the present specification may be conducted in combination to the extent possible.

For example, the radar apparatus 1 described in the above embodiments is an FMCW radar apparatus, but other radar apparatus may be used. For example, an FCM (Fast-Chirp Modulation) radar apparatus may be used.

For example, the radar apparatus 1 described in the above embodiment is a front-side radar apparatus. However, according to the invention, since it is possible to prevent a wrong tracking when a target moving out of FOV from within the FOV, the invention is also applicable to a radar apparatus other than the front-side radar apparatus.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that detects objects in a vicinity of a host vehicle on which the radar apparatus is mounted, the radar apparatus comprising a microcomputer configured to operate as:
   a prediction processor that calculates a prediction position of a previously detected target for a time corresponding to a current detection cycle of the radar apparatus, based on position information of the previously detected target obtained during a previous detection cycle of the radar apparatus; and
   an extrapolation processor that executes an extrapolation to determine that a same target as the previously detected target exists in the prediction position for the current detection cycle, wherein
   the extrapolation processor: (i) executes the extrapolation when the prediction position is outside a detection range of the radar apparatus and a speed of the host vehicle is lower than a predetermined value; and (ii) does not execute the extrapolation when the prediction position is outside the detection range of the radar apparatus and the speed of the host vehicle is greater than the predetermined value.

2. The radar apparatus according to claim 1, wherein when the prediction position is outside the detection range of the radar apparatus, the extrapolation processor does not execute the extrapolation when it is determined, based on behavior information of the host vehicle, that the host vehicle is not being parked.

3. The radar apparatus according to claim 1, wherein when the prediction position is within the detection range of the radar apparatus and within a predetermined range near a border between an inside of the detection range of the radar apparatus and an outside of the detection range of the radar apparatus, the prediction position is deemed to be outside the detection range of the radar apparatus.

4. The radar apparatus according to claim 3, wherein when a newly detected target, which is a target that was not detected in the previous detection cycle, is detected within the predetermined range for the current detection cycle, the prediction position of the newly detected target is not deemed to be outside the detection range of the radar apparatus when the prediction position of the newly detected target is within the predetermined range, before the newly detected target moves from the predetermined range into a portion of the detection range of the radar apparatus excluding the predetermined range.

5. The radar apparatus according to claim 1, further comprising a setting portion that sets an assigned range including the prediction position for each of a plurality of the prediction positions, wherein
   the prediction processor calculates the prediction position of the previously detected target for the time corresponding to the current detection cycle for each previously detected target, and the extrapolation processor executes the extrapolation only when (i) a first prediction position that corresponds to the prediction position of a first target is outside the detection range of the radar apparatus, (ii) a second prediction position that corresponds to the prediction position of a second target is within the detection range of the radar apparatus, (iii) a currently detected target exists within the assigned range including the first prediction position and the assigned range including the second prediction position, and (iv) a distance between the currently detected target and the second prediction position is less than a distance between the currently detected target and the first prediction position.

6. A signal processing method executed by a microcomputer of a radar apparatus having a signal transmitting antenna and a signal receiving antenna, and that detects objects in a vicinity of a host vehicle on which the radar apparatus is mounted, the method comprising the steps of:
   (a) calculating, by the microcomputer, a prediction position of a previously detected target for a time corresponding to a current detection cycle of the radar apparatus, based on position information of the previously detected target obtained during a previous detection cycle of the radar apparatus; and
   (b) executing, by the microcomputer, an extrapolation to determine that a same target as the previously detected target exists in the prediction position for the current detection cycle, wherein
   the step (b) (i) executes the extrapolation when the prediction position is outside a detection range of the radar apparatus and a speed of the host vehicle is lower than a predetermined value; and (ii) does not execute the extrapolation when the prediction position is outside the detection range of the radar apparatus and the speed of the host vehicle is greater than the predetermined value.

7. The method according to claim 6, wherein when the prediction position is outside the detection range of the radar apparatus, the microcomputer does not execute the step (b) when it is determined, based on behavior information of the host vehicle, that the host vehicle is not being parked.

8. The method according to claim 6, wherein when the prediction position is within the detection range of the radar apparatus and within a predetermined range near a border between an inside of the detection range of the radar apparatus and an outside of the detection range of the radar apparatus, the prediction position is deemed to be outside the detection range of the radar apparatus.

9. The method according to claim 8, wherein when a newly detected target, which is a target that was not detected in the previous detection cycle, is detected within the predetermined range for the current detection cycle, the prediction position of the newly detected target is not deemed to be outside the detection range of the radar apparatus when the prediction position of the newly detected target is within the predetermined range, before the newly detected target moves from the predetermined range into a portion of the detection range of the radar apparatus excluding the predetermined range.

10. The method according to claim 6, further comprising:
setting an assigned range including the prediction position for each of a plurality of the prediction positions, wherein in the step (a), the microcomputer calculates the prediction position of the previously detected target for the time corresponding to the current detection cycle for each previously detected target, and in the step (b), the microcomputer executes the extrapolation only when (i) a first prediction position that corresponds to the prediction position of a first target is outside the detection range of the radar apparatus, (ii) a second prediction position that corresponds to the prediction position of a second target is within the detection range of the radar apparatus, (iii) a currently detected target exists within the assigned range including the first prediction position and the assigned range including the second prediction position, and (iv) a distance between the currently detected target and the second prediction position is less than a distance between the currently detected target and the first prediction position.

* * * * *